July 2, 1929.   H. F. L. J. ROCHERON   1,719,783
WINDSHIELD FOR MOTOR VEHICLES
Filed April 30, 1927    4 Sheets-Sheet 1
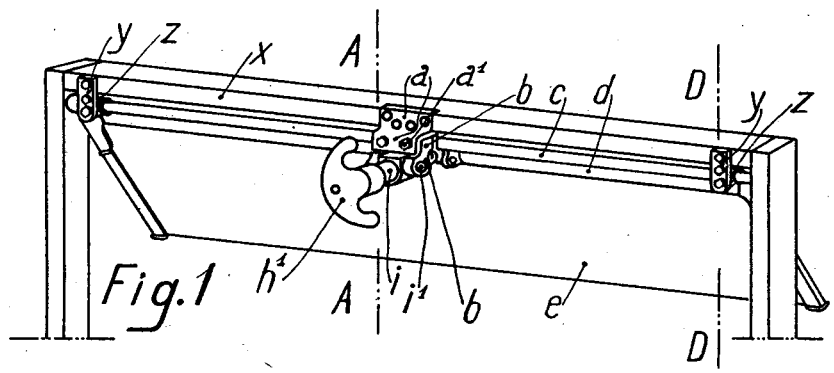
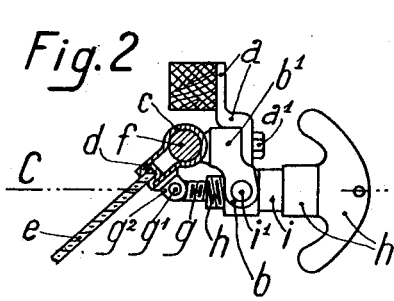
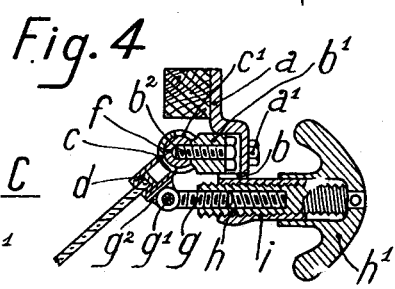
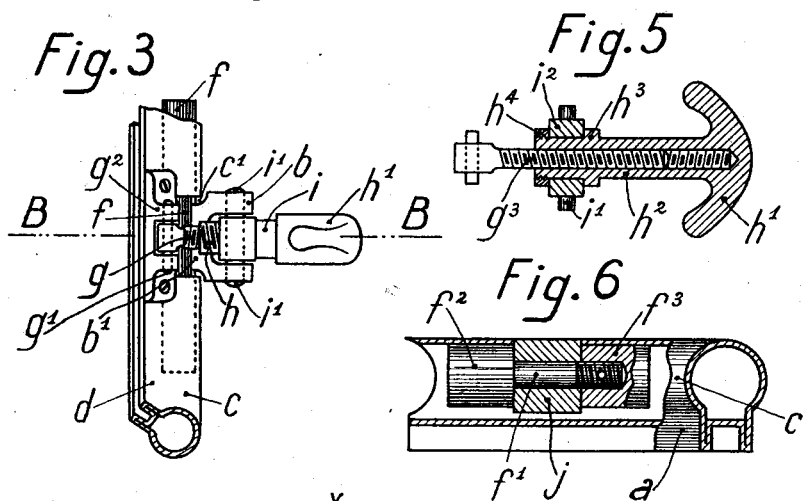
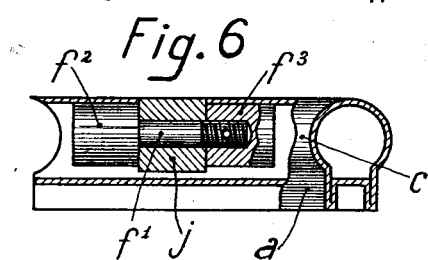
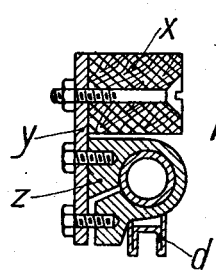
H. F. L. J. Rocheron, Inventor
By C. A. Snow & Co.
Attorneys.

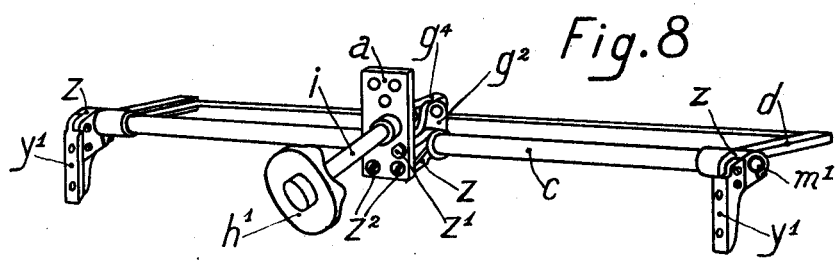
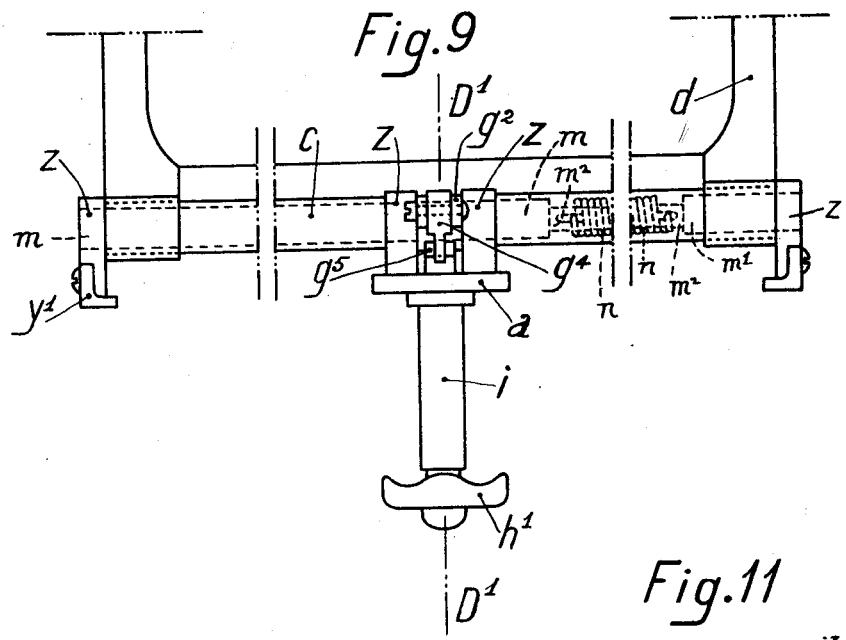
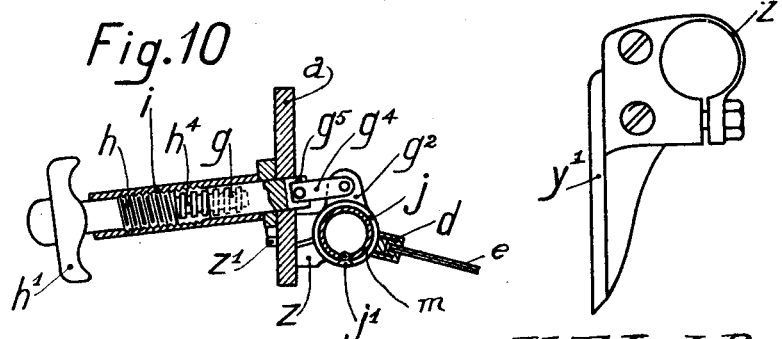

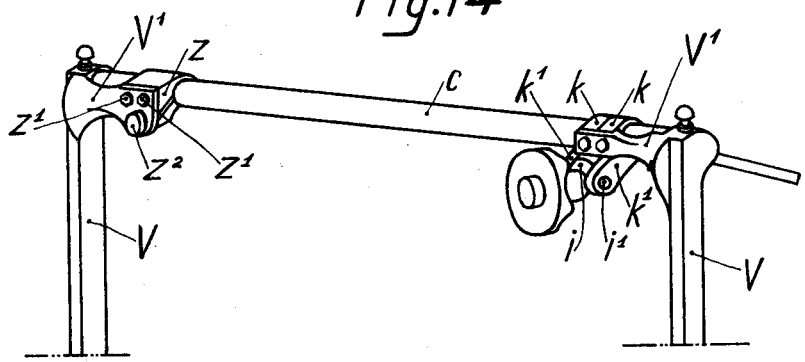
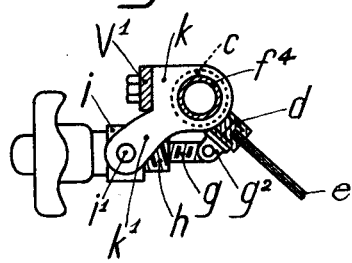
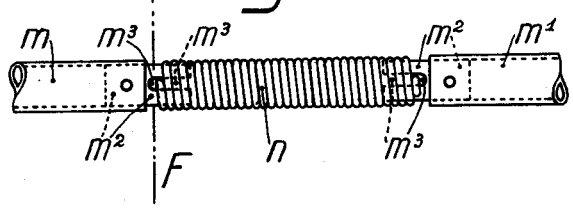
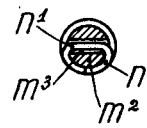

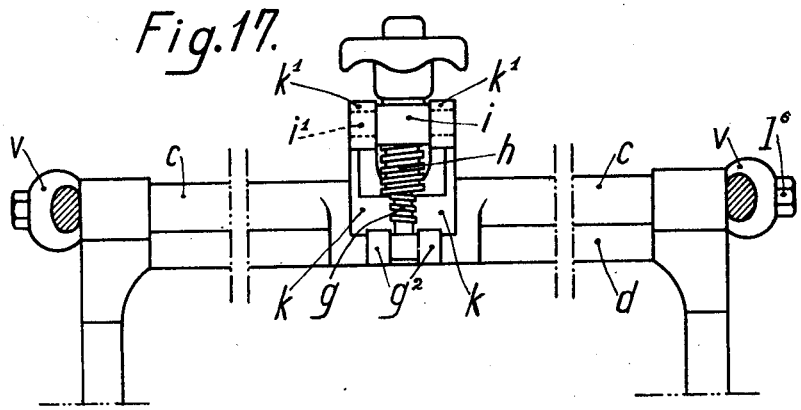
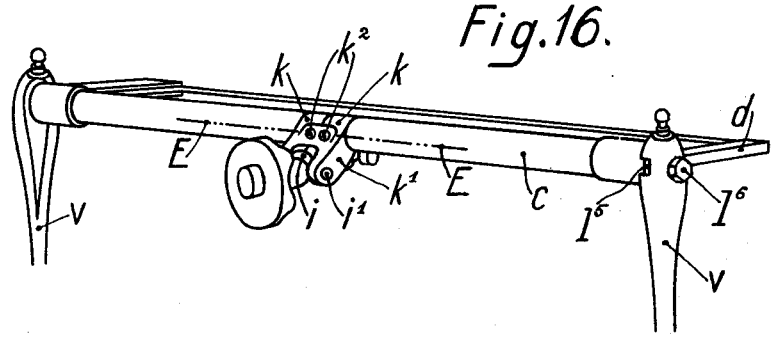
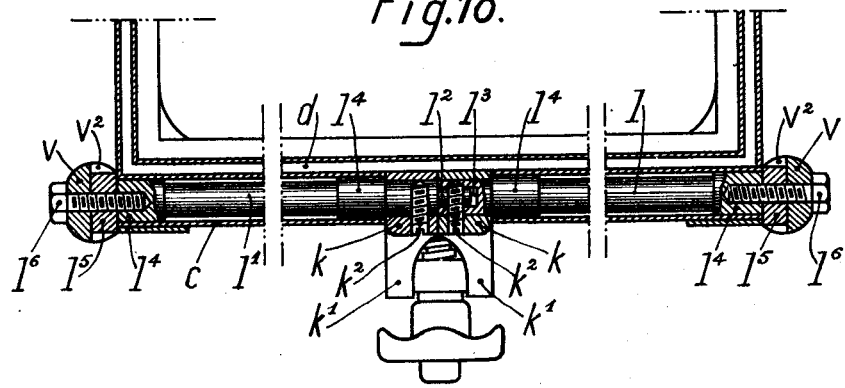

Patented July 2, 1929.

1,719,783

UNITED STATES PATENT OFFICE.

HENRI FRANCOIS LOUIS JOSEPH ROCHERON, OF LEVALLOIS-PERRET, FRANCE.

WINDSHIELD FOR MOTOR VEHICLES.

Application filed April 30, 1927, Serial No. 187,899, and in France May 12, 1926.

The present invention relates firstly to an apparatus for the control of pivoting glass panes employed for the wind shields of vehicles and for like purposes.

The glass pane being pivotally mounted in any suitable manner, and preferably by the use of removable collars, the said controlling apparatus is characterized by the fact that a spacing screw, which is pivotally mounted on the swinging frame of the glass, either directly or by means of a separately secured intermediate member, is engaged, by screwing, with a rotatable controlling element which is rotatably mounted in a sleeve which is secured either rigidly or by a joint to a support which is removably mounted on the stationary part upon which the glass pane is pivoted, or on a stationary part of the vehicle body, or on both these parts; the said controlling element is rotatably engaged with the said pivoted sleeve either by its smooth cylindrical walls (with a stop which prevents all lengthwise motion of the said controlling element) or by suitable co-acting screwed and tapped parts of the said portions, employing a thread which differs from the thread of the said spacing screw, or (preferably) in the contrary direction to this thread. These different features may be employed either separately or in combination in certain parts of the device.

Due to this disposition, the frame of the glass pane is entirely removable, and without damage to the vehicle body or removal of its parts.

In the appended drawings which are given by way of non-limiting example:—

Fig. 1 is a perspective view of a front glass pane for a vehicle adapted for internal driving, illustrating the control apparatus according to the invention;

Fig. 2 shows the said control apparatus in end view on a larger scale, and in section on the line A—A of Fig. 1;

Fig. 3 is a bottom view of the said control apparatus, and

Fig. 4 a section of the apparatus on the line B—B of Fig. 3;

Fig. 5 shows a detail section of a modification of the apparatus as on the line C—C of Fig. 2;

Fig. 6 is an axial section of a pivot collar for securing the member supporting the sleeve;

Fig. 7 is a section on the line D—D of Fig. 1 showing the said pivot collar on a larger scale;

Fig. 8 is a perspective view of a modified form of wind shield;

Fig. 9 is a plan view corresponding to Fig. 8;

Fig. 10 is a section along the line D'—D' of Fig. 9;

Fig. 11 is a side elevational view on a larger scale showing a separate securing collar;

Fig. 12 is a detail of the compensating device of Fig. 9;

Fig. 13 is a section on the line F—F of Fig. 12;

Fig. 14 is a perspective view of another embodiment of the invention;

Fig. 15 is a sectional detail through the operating mechanism of Fig. 14;

Fig. 16 is a perspective view of another form of my invention;

As shown in Fig. 1, on frame $x$ of the vehicle body are bolted the lugs $y$ to which are screwed the removable pivot collars $z$ whose pressure can be regulated. To the said frame is bolted the plate $a$ which supports the above-mentioned operating device.

In the example shown in Figs. 1 to 4, the said operating device comprises a fork $b$ whose rear end $b^1$, which extends through an aperture $c^1$ formed in the tube $c$ serving to rotate the frame $d$ of the glass pane $e$, is secured by a screw $b^2$ to an axle $f$ which is mounted with light friction in the tube $c$. The head of the screw $b^2$ is placed within the end part $b^1$ below the plate $a$ which is secured to the end part $b^1$ by the screws $a^1$. A screw $g$ with left hand thread is pivoted to an axle $g^1$ in a fork $g^2$ screw to the frame $d$ of the glass. The screw $g$ is axially engaged with a controlling device comprising a second screw $h$ adapted to screw upon the screw $g$ by means of its internal thread. The screw $h$ has a right handed thread at the exterior, and to its end is secured by threads and a pin, an operating handle $h^1$. The screw $h$ engages at the outer part the sleeve $i$ having an internal thread of the same pitch as said screw and pivotally mounted in the forked bracket $b$ by the two journals $i^1$. The handle $h^1$ is made hollow so as to slide upon the sleeve $i$.

It is obvious that if the handle $h^1$ is rotated to the right, the screw $h$ will be displaced longitudinally in the sleeve $i$—which cannot move lengthwise—and thus drives out the forked bracket $g^2$ whereby the frame $d$ of the glass will be raised. This movement can be effected by reason of the three joints which will be mentioned as follows and which cooperate in such manner as to compensate for the variations in the mutual spacing of the members; i. e. the joint of the glass frame adjacent the end part of the forked bracket $b$, the joint of the sleeve $i$ in the said bracket, and the joint of the screw $g$ in its forked bracket $g^2$. During this first movement, the right hand rotation of the screw $h$ will drive out, by unscrewing, the left handed screw $g$ and thus furthers the raising of the glass. The glass pane is closed by the left hand rotation of the handle $h^1$; in these different movements, the handle $h^1$, due to the telescoping of the two screws, will effect a restricted lengthwise motion, so that it will have a reduced size.

In the case, not represented, in which the two screws are threaded in the same direction but at a different pitch, the apparatus will still operate, but the speed of opening and closing is proportional to the effective difference between the two pitches, thus requiring a longer stroke of the handle $h^1$ in the lengthwise direction.

In the modification which is partially represented in Fig. 5, the right handed screw $g^3$ is screwed into a controlling device which consists of a rod $h^2$ carrying a handle $h^1$; said device is rotatable between a bearing portion $h^3$ and a nut $h^4$ held thereon, in a sleeve $i^2$ pivoting in the forked bracket $b$, not shown in Fig. 5. In this example, the movement of the glass pane is effected by screwing or unscrewing the rod $h^2$ on the screw $g^3$ which is thus moved in or out.

In Fig. 6, a collar which is rotatable on the axle $f$ secured at one end to a cylindrical head $f^2$ and screwed at the other into a second cylinder $f^3$, both of which are mounted in the tube $c$, is so disposed as to receive the outer end $b^1$ of the forked bracket $b$ by suitable securing means.

To remove the window, it is simply necessary to unscrew the screws holding the collars $z$ to the lugs $y$, and also the screws $a^1$ securing the forked bracket $b$ to the plate $a$. These two last-mentioned parts may obviously be formed in one, and herein, for the removal of the glass pane, it is necessary to unscrew the screw $b^2$ whose head now extends outwardly, and also to remove the screw $g$ altogether from the screw $h$ or $h^2$.

In the construction shown in Figs. 8 to 11, the plate $a$ which is secured to a suitable part of the vehicle body, has mounted thereon the sleeve $i$, in which is disposed, according to the characteristics of the invention, a pair of screws $g$ and $h$ having opposite threads, and herein the screw $g$ is a female screw and engages a male extension part $h^4$ (with opposite thread) of the screw $h$ which is secured to a handle $h^1$. The screw $g$ coacts a bifurcated lug $g^2$ by means of a link $g^4$ which is pivoted in said bracket and in the forked end $g^5$ of the screw $g$. The fork $g^2$ is secured to a collar $j$ which is held by a screw $j^1$ or by like means on the rotatable tubular axle part $m$ of a two part operating shaft which is secured to the tube $c$ supporting the glass frame $d$. To the stationary plate $a$ are secured by two bolts $z^1$ and two screws $z^2$ for taking up the wear, two collars $z$ in which the axle $f^4$ is rotatable. The said collars surround the forked bracket $g^2$. The ends of the rotatable axle part $m$ are mounted in two other collars $z$ arranged for taking up the wear, which are removably bolted to two angle brackets $y^1$ mounted on the vehicle body.

In order to compensate for the weight of the glass frame $d$, the shaft part $m$ cooperates with a second shaft part through the medium of a compensating device which will now be described with reference to Figs. 12 and 13. Into each end of the hollow shaft $m$ $m^1$ is secured a spindle $m^2$ each of which is slotted at $m^3$. The two parts of the shaft $m$ $m^1$ are connected together by means of a spiral spring $n$ whose open extremities engage over the spindles $m^2$ and whose wire ends are bent over and engage in the slots $m^3$.

As shown in Fig. 9, the said compensating spring is disposed in the tube $c$ of the frame where it is completely hidden from view thereby enhancing the symmetrical appearance of the whole device as well as protecting the said compensating spring. The portion $m^1$ of the shaft $m\,m^1$ is fixed to one of the outer collars $z$ by any suitable means or simply by tightening the said collar $z$ and the main portion $m$ of the shaft $m\;m^1$, as previously pointed out, is rigidly connected to the frame tube $c$. In assembling, one of the spindles $m^2$ is rotated through a sufficient number of turns in the proper direction, in order to compensate for the weight of the frame $d$ by means of the energy stored therein, before securing the said spindle to its respective end of shaft $f^4$.

In the modification shown in Figs. 14 and 15, the wind shield is mounted on two uprights V, each of which carries a supporting bracket $V^1$. To each bracket is secured by the bolts $z^1$ a collar $z$ provided with a screw $z^2$ for taking up the wear; said collar forms a bearing in which is rotatable the central shaft $f^4$ secured to the tube $c$ and to the frame $d$. To the other bracket $V^1$ are bolted two collars $k$ which also form bearings for the rotation of the shaft $f^4$; the two collars $k$ are provided with two symmetrically extending lugs $k^1$ which constitute a fork. The sleeve $i$ of the controlling device comprising the double screw $g$—$h$, may be mounted in the said two-part bracket, by means of the axles $i$ cast in one therewith. The screw $g$ is pivoted in a fork $g^2$ which is mounted on the frame $d$.

The third modification (Figs. 16 to 18) also relates to a wind shield mounted on the uprights V; the rotating shaft is mounted on the said uprights and the tube $c$ is rotatable on the said shaft. The said shaft consists of two parts $l$ and $l^1$ which are secured together in a removable manner, due to the insertion of a stud $l^2$, secured to the part $l^1$, into an axial hole $l^3$ in the part $l$. Each of the parts $l$ and $l^1$ is provided with a bearing portion $l^4$ for the rotation of the tube $c$ and is held in the corresponding upright V by means of its flat end $l^5$ which is engaged in a recess $V^2$ in the upright and is secured by the screw $l^6$. The said parts may be mounted in any other suitable manner. The controlling device $g$—$h$—$i$ which is pivoted due to the engagement of the screw $g$ in the fork $g^2$ mounted on the frame $d$, is enabled to pivot—as in the second modification—upon its journals $i^1$ which are mounted in the forked lugs $k^1$ of the two collars $k$, but in this modification, the collars $k$ are held upon the stationary axle $l$—$l^1$ by two screws $k^2$ whereof one holds the stud $l^2$ in its recess and thus assures the assembling of the two parts of the shaft.

Having thus described my invention, what I claim is:

1. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a threaded male and female member having a pitch opposite to said first mentioned threads interconnecting the abutting ends of said rods, a link interconnecting said rods and said lugs, means for fixing said other shaft part with respect to said first mentioned shaft part and a compensating spring interconnecting the said shaft parts for the purpose set forth.

2. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a high-pitch threaded male and female member having a pitch opposite to said first mentioned threads interconnecting the abutting ends of said rods, a link interconnecting said rods and said lugs, means for fixing said other shaft part with respect to said first mentioned shaft part and a compensating spring interconnecting the said shaft parts for the purpose set forth.

3. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a threaded male and female member having a pitch opposite to said first mentioned threads interconnecting the abutting ends of said rods, a link interconnecting said rods and said lugs, means for fixing said other shaft part with respect to said first mentioned shaft part, a compensating spring interconnecting the said shaft parts and a tubular wind-shield support surrounding said shaft parts and said spring fixed to said first mentioned shaft part for the purpose set forth.

4. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a high pitched threaded male and female member interconnecting the abutting ends of said rods having a pitch opposite to said first mentioned threads, a link interconnecting said rods and said lugs, means for fixing said other shaft part with respect to said first mentioned shaft part, a compensating spring interconnecting the said shaft parts and a tubular wind-shield support surrounding said shaft parts and said spring fixed to said first mentioned shaft part for the purpose set forth.

5. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a threaded male and female member having a pitch opposite to said first mentioned threads interconnecting the abutting ends of said rods, a link interconnecting said rods and said lug, means for fixing said other shaft part with respect to said first mentioned shaft part, a compensating spring interconnecting the said shaft parts and a plurality of split collars adapted to support said operating shaft for the purpose set forth.

6. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a threaded male and female member having a pitch opposite to said first mentioned threads interconnecting the abutting ends of said rods, a link interconnecting said rods and said lug, means for fixing said other shaft part with respect to said first mentioned shaft part, a pair of spindles fixed one in each end of the parts of said hollow operating shaft and a coiled compensating spring engaging over said spindles and fixed thereto for the purpose set forth.

7. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a threaded male and female member having a pitch opposite to said first mentioned threads interconnecting the abutting ends of said rods, a link interconnecting said rods and said lug, means for fixing said other shaft part with respect to said first mentioned shaft part, a pair of bifurcated spindles fixed one in each end of the parts of said hollow operating shaft, a coiled compensating spring engaging over said spindles and a plurality of means on the extremities of said spring lodged in said bifurcated spindles for the purpose set forth.

8. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a threaded male and female member having a pitch opposite to said first mentioned threads interconnecting the abutting ends of said rods, a link interconnecting said rods and said lugs, an adjustable split collar for fixing said other shaft part with respect to said first mentioned shaft part and a compensating spring interconnecting the said shaft parts for the purpose set forth.

9. In a device of the type described, a hollow two-part operating shaft, a lug carried by one of said shaft parts, a plate mounted adjacent said lug, a threaded sleeve carried by said plate, a plurality of correspondingly threaded rods disposed in abutting relation in said sleeve, a threaded male and female member having a pitch opposite to said first mentioned threads, a fork formed on said lug, a bifurcated extremity on said rod, a link disposed in said bifurcations and pivotally connected thereto, means for fixing said other shaft part with respect to said first mentioned shaft part and a compensating spring interconnecting the said shaft parts for the purpose set forth.

In testimony whereof I affix my signature.

HENRI FRANCOIS LOUIS JOSEPH ROCHERON.